(12) United States Patent
Poppinga et al.

(10) Patent No.: US 12,545,142 B2
(45) Date of Patent: Feb. 10, 2026

(54) CONTROL DEVICE FOR A MOTOR VEHICLE, MOTOR VEHICLE, AND METHOD FOR PROVIDING A STATIONARY FUNCTION IN A PARKED STATE OF THE MOTOR VEHICLE

(71) Applicant: AUDI AG, Ingolstadt (DE)

(72) Inventors: Benjamin Poppinga, Wettstetten (DE); Simon Seitle, Oberhausen (DE)

(73) Assignee: AUDI AG, Ingolstadt (DE)

( * ) Notice: Subject to any disclaimer, the term of this patent is extended or adjusted under 35 U.S.C. 154(b) by 86 days.

(21) Appl. No.: 18/404,279

(22) Filed: Jan. 4, 2024

(65) Prior Publication Data

US 2024/0262240 A1  Aug. 8, 2024

(30) Foreign Application Priority Data

Feb. 7, 2023  (DE) .......................... 102023102952.5

(51) Int. Cl.
*B60L 53/80* (2019.01)
*H02J 7/00* (2006.01)
*H02J 7/34* (2006.01)

(52) U.S. Cl.
CPC ............ *B60L 53/80* (2019.02); *H02J 7/0063* (2013.01); *H02J 7/342* (2020.01); *B60L 2250/12* (2013.01); *B60L 2250/16* (2013.01); *Y02T 10/70* (2013.01)

(58) Field of Classification Search
CPC .. B60L 53/80; B60L 2250/12; B60L 2250/16; B60L 58/12; B60L 58/13; B60L 1/00; B60L 53/00; B60L 58/10; B60L 2260/52; B60L 2260/54; H02J 7/0063; H02J 7/342
See application file for complete search history.

(56) References Cited

U.S. PATENT DOCUMENTS

2019/0111924 A1* 4/2019 Rajendran ............. B60W 30/18

FOREIGN PATENT DOCUMENTS

| DE | 102012220549 A1 | 5/2014 | |
| DE | 102013205638 A1 | 10/2014 | |
| EP | 3067240 B1 | 4/2019 | |
| WO | WO-2017173420 A1 * | 10/2017 | ............. B60L 53/80 |

OTHER PUBLICATIONS

Search Report issued on Nov. 13, 2023 in corresponding German application No. 10 2023 102 952.5; 10 pages.

* cited by examiner

*Primary Examiner* — Michael C Zarroli
(74) *Attorney, Agent, or Firm* — Maier & Maier, PLLC

(57) ABSTRACT

A method for controlling an operation of a motor vehicle, which includes a low-voltage on-board electrical system and a high-voltage on-board electrical system having a high-voltage energy storage device. In order to provide at least one stationary function in a parked state of the motor vehicle, a component of the motor vehicle that carries out the stationary function is supplied with energy from the low-voltage onboard electrical system, at least one energy profile, which relates to the use of the at least one stationary function by a user of the motor vehicle, is provided and the operation of the motor vehicle is controlled depending on this energy profile.

20 Claims, 1 Drawing Sheet

CONTROL DEVICE FOR A MOTOR VEHICLE, MOTOR VEHICLE, AND METHOD FOR PROVIDING A STATIONARY FUNCTION IN A PARKED STATE OF THE MOTOR VEHICLE

FIELD

The invention relates to a method for controlling an operation of a motor vehicle, which comprises a low-voltage on-board electrical system and a high-voltage on-board electrical system having a high-voltage energy storage device, wherein in order to provide at least one stationary function in a parked state of the motor vehicle, a component of the motor vehicle that carries out the stationary function is supplied with energy from the low-voltage onboard electrical system. The invention furthermore also relates to a control device for a motor vehicle and a motor vehicle.

BACKGROUND

The spread of electric vehicles is currently increasing rapidly. Applications now result for electric vehicles that were not conceivable for normal vehicles operated by internal combustion engines. In particular, applications when a motor vehicle powered by a combustion engine is stationary or when the vehicle is parked are generally difficult to argue due to the $CO_2$ balance, since the primary energy source in internal combustion vehicles is based on fossil fuels and the use of the 12-volt battery is restricted to be able to guarantee an engine start. Electric vehicles are designed fundamentally differently than internal combustion vehicles and therefore many applications are possible that are unthinkable with internal combustion vehicles. However, previous electric vehicles, especially battery-electric vehicles (BEVs), are currently designed to maximize the range of the vehicle. Likewise, the high-voltage system is typically not intended for entertainment functions or other functions when stationary. This means that previous electric vehicles have only limited application options and limited customer benefits when stationary. In addition, the system based on the 12-volt battery alone is not adequately designed for many applications. In the 12-volt on-board electrical system there is typically only a very limited energy storage option, and the energy stored in the high-voltage energy storage device cannot be used because the high-voltage system is typically switched off in the parked state of the vehicle.

DE 10 2012 220 549 A1 describes an electric vehicle having a rechargeable battery unit, on which a first voltage of at least 200 volts can be tapped via a first pair of connections, and a second voltage that is less than 20 percent of the first voltage on a second pair of connections. Furthermore, the electric vehicle comprises an on-board electrical system that can be fed with the lower voltage via the second pair of connections. This means that a separate on-board electrical system battery can be saved.

DE 10 2013 205 638 A1 describes a vehicle having an on-board electrical system, which comprises a first sub-on-board electrical system having a first energy storage device and a second sub-on-board electrical system having a second energy storage device and a DC-DC converter between the two sub-on-board electrical systems. The vehicle also comprises a voltage conversion unit that converts electrical power unidirectionally from the nominal voltage level of the high-voltage battery to a voltage level that results in an electrochemical overpotential on the low-voltage battery in order to be able to charge it. The low-voltage battery can be recharged via the voltage conversion unit in the idle status of the vehicle, that is, when the vehicle is inoperative, and a consumer that is connected in parallel to the low-voltage battery can also be supplied with electrical power while the vehicle is being charged or is in standby mode. During the charging mode, consumers such as control devices for controlling the charging and water pumps for cooling can be supplied. The charging current is then used to directly supply these components. In the stationary mode, which is different from an idle status of the vehicle, consumers such as light modules for functions such as hazard lights, sidelights, or parking lights or entertainment components such as radio or music playback devices can be supplied.

Even if a high-voltage energy storage device can be used to recharge a low-voltage energy storage device, the implementation of stationary functions is still problematic in that they can potentially consume a large amount of energy, which can greatly reduce the remaining range that can still be driven with the electric vehicle. The provision of such stationary functions can potentially result in unpleasant surprises for a user who is then confronted with an empty or almost empty high-voltage energy storage device after using such stationary functions. This in turn greatly reduces user comfort.

SUMMARY

The object of the present invention is therefore to provide a method, a control device, and a motor vehicle which make it possible to provide at least one stationary function of a motor vehicle without reducing the comfort of a user, in particular with regard a range of the motor vehicle reduced by the use of the stationary function.

In a method according to the invention relates for controlling an operation of a motor vehicle, which comprises a low-voltage on-board electrical system and a high-voltage on-board electrical system having a high-voltage energy storage device, to provide at least one stationary function in a parked state of the motor vehicle, a component of the motor vehicle that carries out the stationary function is supplied with energy from the high-voltage on-board electrical system. Furthermore, at least one energy profile, which relates to the use of the at least one stationary function by a user of the motor vehicle, is provided and the operation of the motor vehicle is controlled depending on the energy profile.

Such an energy profile advantageously makes it possible to design the control of the operation of the motor vehicle in a situation-dependent and/or user-specific manner with regard to the at least one stationary function. For example, preferences or priorities regarding the use of the stationary function can be stored in the energy profile. Providing such an energy profile advantageously makes it possible to take preferences of a user into consideration. This means that the needs of a user with regard to such a stationary function can ultimately be taken into consideration, and the user is then confronted with unpleasant surprises less often or no longer at all, for example regarding the charge level of the high-voltage energy storage device after using the stationary function. For example, it can be stored in such an energy profile whether a user prioritizes the use of such a stationary function or instead the greatest possible range of the motor vehicle. A variety of other data and information can also be taken into consideration in such an energy profile, which can also improve the use of the stationary function and make it more energy efficient. Above all, the provision and use of such an energy profile enables significantly more predictive energy management of the entire motor vehicle with regard to the use of the stationary function. For example, if it is known based on the energy profile that a user uses stationary functions very frequently, significantly more energy can be charged from the high-voltage system into the low-voltage on-board electrical system as a precautionary measure, and, for example, not only when the low-voltage on-board electrical system has a corresponding energy deficit. The low-voltage on-board electrical system can therefore be recharged in significantly more favorable situations. Such an energy profile advantageously allows, on the one hand, stationary functions for the motor vehicle to be provided without reducing the comfort for a user with regard to a reduced range of the motor vehicle, since such an energy profile allows the energy management of the motor vehicle to be carried out depending on the specifications, needs, and wishes of the user and to be adapted thereto.

A motor vehicle can be, for example, an electric vehicle or a hybrid vehicle. The motor vehicle is preferably solely a battery-electric motor vehicle. The high-voltage energy storage device of the high-voltage vehicle electrical system can be provided, for example, by a high-voltage battery. The parked state of the motor vehicle is defined such that the motor vehicle is not driven in this state. The motor vehicle is therefore parked. In addition, a drive unit assigned to the motor vehicle, for example an electric motor, is inactive or switched off. The "ignition" of the motor vehicle can be optionally active or not. In particular, the low-voltage on-board electrical system can be active in the parked state of the motor vehicle or can also be in an idle mode. The stationary function is preferably an entertainment function. However, other stationary functions can also be carried out and defined in the same way in the parked state of the motor vehicle. Safety services can also be considered as a stationary function, such as the use of the motor vehicle as a mobile street lamp, for example by activating the headlights, and functions such as a user recognition function that allows early recognition of a vehicle user outside the vehicle, in particular based on the identification of the user based on his gait by means of environmental sensors of the motor vehicle, in particular without the need for the presence of a vehicle key. Monitoring functions of the motor vehicle can also be counted among such stationary functions. For this purpose, the motor vehicle can monitor its surroundings, similar to an alarm system. The monitoring of internal systems and components for their proper functionality and the detection of error states can also be seen as such a standard function. In general, it is now possible to implement significantly more energy-intensive stationary functions, which are carried out by low-voltage on-board electrical system components or low-voltage on-board electrical system consumers, even in the parked state of the motor vehicle, at least if this is permitted according to the energy profile or within a certain framework that can be specified by the energy profile. The operation of the motor vehicle being controlled depending on the energy profile can comprise that the operation of the motor vehicle is controlled with regard to carrying out the stationary function, but the control of the operation is not restricted thereto. For example, charging processes of the motor vehicle for charging the high-voltage energy storage device, certain energy reserves held in the high-voltage energy storage device, or the like can also be controlled depending on the energy profile. Above all, functions of the motor vehicle relating to energy management are thus generally controlled depending on such an energy profile.

The component of the motor vehicle that carries out the stationary function is a low-voltage on-board electrical system consumer. This is therefore connected to the low-voltage on-board electrical system of the motor vehicle and is supplied accordingly from the low-voltage on-board electrical system.

A stationary function of the motor vehicle is a function that can be used when the motor vehicle is stationary. The usage possibility of this stationary function does not have to be limited to when the vehicle is stationary but can optionally also be used while driving.

The low-voltage on-board electrical system can be, for example, a 12-volt on-board electrical system of the motor vehicle. The high-voltage on-board electrical system is assigned a significantly higher voltage level, for example at least 60 volts or more, for example 400 volts or even 800 volts.

It is also possible for the low-voltage on-board electrical system to be fed by the high-voltage on-board electrical system. In particular, this is not only possible during driving operation of the motor vehicle, but can also be possible at least temporarily in the parked state of the motor vehicle. For example, the high-voltage on-board electrical system can be activated temporarily in the parked state of the motor vehicle, for example when necessary, in order to transfer energy to the low-voltage on-board electrical system. In this case, it is also possible to temporarily switch on or activate the high-voltage system, in particular in the parked state of the motor vehicle, in order, for example, to supply a low-voltage energy storage device assigned to the low-voltage vehicle electrical system, for example a low-voltage battery, with energy from the high-voltage energy storage device, for example via a DC-DC converter. This recharging of the low-voltage energy storage device by the high-voltage energy storage device can also be carried out in a much more situation-adapted manner, and in particular in accordance with the needs of the user or their priorities specified by the energy profile, for example with regard to a maximum permitted amount of energy that may be transferred from the high-voltage energy storage device into the low-voltage on-board electrical system.

In principle, it is therefore preferred that the motor vehicle is designed in such a way that energy can be transferred from the high-voltage on-board electrical system to the low-voltage on-board electrical system even in the parked state of the motor vehicle, if at least one recharging condition is met, for example the current charge level of the low-voltage storage device falls below a certain limiting value and/or the use of the stationary function is still desired if the defined remaining range or remaining amount of energy in the high-voltage energy storage device has not yet been reached. It can therefore be provided that, at least when such a recharging condition is met, energy is transferred from the high-voltage on-board electrical system to the low-voltage on-board electrical system in the parked state of the motor vehicle. The recharging condition can comprise that a charge level of a low-voltage energy storage device of the low-voltage vehicle electrical system is less than a limiting value and/or, depending on the energy profile, an energy requirement for carrying out the at least one stationary function is predicted, which is higher than a limiting value or is higher than the amount of energy currently stored in the low-voltage storage device.

In a further advantageous embodiment of the invention, multiple different energy profiles are provided for a user to choose from for the use of the at least one stationary function, and the specific energy profile is selected from the multiple energy profiles depending on a user input. As a result, the user can advantageously determine himself, in particular manually, how the energy management of the motor vehicle is to be handled with regard to carrying out the at least one stationary function. For example, the different energy profiles can define a certain weighting between carrying out the stationary functions and the range of the motor vehicle. For example, an energy profile can be defined which specifies the range of the motor vehicle as the top priority, a further energy profile which specifies carrying out stationary functions as the top priority, a further energy profile which specifies approximately equal weighting of the range and carrying out stationary functions, and so on. Additional energy profiles for other weightings are possible as desired. For example, it is also conceivable that an energy profile is selected in that a weighting factor between range and use of the stationary function is continuously selectable and settable. By selecting one of the multiple energy profiles, the user can, for example, define whether a large amount of energy is allowed to be used to carry out stationary functions or not. This means that user wishes, preferences, and priorities can be integrated easily into the energy management of the motor vehicle.

In a further advantageous embodiment of the invention, the specific energy profile is created user-specifically for a specific user, in particular by means of an artificial neural network, and stored as assigned to this user. Not only can a general energy profile be activated and stored in the motor vehicle, for example by manual selection, which is then used in the same way for all users, but a user-specific energy profile can advantageously also be provided. This can in turn be accomplished in different ways. In general, it is also conceivable that each user can select their own energy profile themselves from multiple predefined energy profiles, as described above, for example. The selected energy profile is then saved for each user and, for example, assigned to a user profile of the user. If the corresponding user uses the motor vehicle, the motor vehicle is operated according to the energy profile stored for this user. It is particularly advantageous if such a user-specific energy profile does not have to be selected manually by the user, but can also be created automatically in a user-specific manner, for example. However, this does not preclude certain manual selection options by the user for such an energy profile. For example, certain user preferences or priorities that the user has manually input into the system, in particular into the motor vehicle, can also be taken into consideration when automatically creating such a specific user-specific energy profile. The creation of such an energy profile, in particular using an artificial neural network, can be based on a learning method, and is also particularly advantageous since this can take place in the background without action of the user, due to which the needs, preferences, and priorities of the user can also be learned by the system without manual input.

For example, a corresponding energy profile can define various options, and a user can define the desired energy option by selecting one of the energy profiles. On the other hand, an energy profile can also be created in a user-specific and therefore user-individual manner, whether automatically, for example by learning the user behavior or by deriving information from the user behavior in relation to the motor vehicle and the use of the stationary function, or by alternative or additional use of manual user inputs to set certain preferences, priorities, or the like or to define options. In general, at least one piece of information can be recorded and profile information can be stored in the energy profile depending on the information. There are now several options for how such information can be recorded and in which way profile information can be saved depending on this recorded information.

It represents a further advantageous embodiment of the invention if at least one piece of information is specified by a user input and profile information is stored in the specific energy profile depending on the information. Such a user input can be made by a user. This can be done, for example, directly in the motor vehicle or via an app assigned to the motor vehicle, that is, an application program that can run on a mobile communication device and is assigned to the motor vehicle. The same applies to any manual input by the user, for example, also to the manual selection of an energy profile described above. Via such a user input, the user can, for example, specify preferences, priorities, or the like. He can also enter further information, such as calendar entries, into the control device that controls the motor vehicle or the operation of the motor vehicle, from which, for example, future usage data of the vehicle by the user can be derived by a control device of the motor vehicle. The information recorded in this way by the motor vehicle or its control device, which was communicated by the user input, can then either be stored directly as profile information in the energy profile that is assigned to the user, or further information can in turn be derived therefrom, which can then be stored accordingly as profile information, as explained using the calendar entries as an example.

In a further advantageous embodiment of the invention, the specific energy profile and/or at least one piece of information, depending on which profile information is stored in the specific energy profile, comprises a priority specification related to the use of the stationary function, in particular with respect to maximizing a range of the motor vehicle. Such a priority specification can, for example, according to a first example specify that the use of the stationary function is to have priority over maximizing the range of the motor vehicle, according to a second example specify that maximizing the range of the motor vehicle is to have priority over the use of the stationary function, or according to a third example specify that the use of the stationary function and maximizing the range are to be weighted approximately equally. A user can, for example, select between these three prioritization options, which have been designated in the present case as examples. Alternatively, it is also possible for the control device itself to derive and store these priorities from historical data relating to the previous usage behavior of the user, in particular with regard to the motor vehicle and/or with regard to the use of the stationary function.

It is advantageously possible by way of such a priority specification to store the priorities of the user in energy profile and operate the vehicle according to the priorities of the user, in particular with regard to the use of the stationary functions. This can significantly increase user comfort and energy management is much more likely to be in harmony with the expectations of the user.

According to a further very advantageous embodiment of the invention, the specific energy profile and/or profile information that is stored in the energy profile and that is derived from recorded information comprises user-specific, historical usage data of the use of the motor vehicle, in particular certain motor vehicle functions, by the user. This usage data does not necessarily have to be user-specific, but can in principle also be recorded and used across multiple users. However, in order to create a user-specific energy profile, it is very advantageous to also consider such historical usage data in a user-specific manner. A distinction can be made between different users of the motor vehicle, for example, based on the respective keys assigned to the users, which are detected and identified in the vehicle or in its vicinity by the vehicle when the vehicle is used. Alternatively, a user profile can also be created in the motor vehicle and the user can select his user profile when using the motor vehicle and thereby inform the vehicle that be is now the current user of the vehicle. This also automatically informs the motor vehicle which of multiple users is now currently using the motor vehicle.

Numerous pieces of useful information for creating an energy profile or for use as profile information to be stored in the energy profile can advantageously be derived from historical usage data. Based on the historical usage data, the control device can figuratively observe what priorities the user sets with regard to the use of the stationary function, how often he would like to use it, which routes he typically drives, and so on.

This makes it possible to adapt the energy management to the use of the stationary function much better. In particular, this also in turn allows for significantly more predictive energy management, as predictions about the future behavior of the user can be made much more easily based on the historical usage data. This makes it easier, for example, to determine remaining ranges that better correspond to the needs of the user and which are still to be available after using the stationary function, for example, so that the user can still use the motor vehicle as desired, and for example can reach the next, familiar charging station or home.

There are now many different options that can be combined with one another for this historical usage data. To name a few examples, the usage data can relate, for example, to the use of the at least one stationary function, and/or to a driving behavior, comprising route data of routes traveled and/or a driving style that influences the energy consumption per unit of route, and/or they can relate to a time-dependent use of the motor vehicle or certain functions of the motor vehicle, i.e., when and for how long the motor vehicle is used in what way and when and for how long which motor vehicle functions are used, and/or the historical usage data can relate to carrying out charging processes, in particular to a charging strategy typically used by the user and/or a temporal charging behavior, typical charging times, typical charging locations, and so on.

If it is determined from the historical usage data, which relate, for example, to the charging strategy, that the user typically does not fully charge his motor vehicle during a charging process, but only enough to ensure sufficient range until the next charging process, for example typically up to a charge level of 80 percent, and at the same time it is observed that the user uses the stationary function very often or has specified that he would like to use it very often, a little more can be automatically charged in future charging processes, for example up to a charge level of 90 or 95 percent, wherein the additionally charged 10 or 15 percent charge level can then be reserved for the use of the stationary function, for example. This can also run completely in the background without the user noticing or having to actively contribute in any way. He can charge his vehicle as usual and a sufficient energy reserve is automatically reserved for operating the stationary function by the procedure described.

For example, if a user would like to use the stationary function for a longer period of time even though the energy reserve intended for this purpose has already been used up, it can be determined, for example, based on the historical usage data, for example the routes typically driven after using the stationary function to the next charging stop, how much remaining range still has to be ensured in order to still make this possible in the present case after using the stationary function. If there is still enough energy stored in the high-voltage energy storage device for this purpose, the stationary function can still be operated for longer, for example until the corresponding remaining range determined based on the historical usage data has been reached. There are numerous options for adapting the operation of the motor vehicle and the energy management even better to the needs of a user, especially with regard to the use of the stationary function.

As already mentioned above, there are also numerous advantageous ways in which the energy profile can now be used specifically to control the operation of the motor vehicle. In addition, there are many other advantageous options for integrating this energy profile into the operation of the motor vehicle or into the control of the operation of the motor vehicle. It therefore represents a further very advantageous embodiment of the invention if at least one of the following operating functions is carried out depending on the energy profile:

A charging process for charging the high-voltage energy storage device is controlled depending on the energy profile;

Energy is charged from the high-voltage on-board electrical system into the low-voltage on-board electrical system, in particular into a low-voltage energy storage device, depending on the energy profile;

A specific first amount of energy stored in the high-voltage energy storage device is reserved for carrying out the at least one stationary function depending on the energy profile;

Depending on the energy profile, a specific remaining amount of energy in the high-voltage energy storage device is determined, which is not usable to carry out the stationary function, or a minimum charge level of the high-voltage energy storage device is determined, when the charge level reaches or falls below this level, the at least one stationary function can no longer be performed and/or is deactivated;

A remaining charge level to be displayed to the user and/or a remaining range to be displayed to the user is determined depending on the energy profile or is modified and displayed relative to the actual remaining charge level or the actual remaining range.

Depending on the energy profile, a charging process for charging the high-voltage energy storage device can be controlled, for example. This is at least possible in the example already mentioned above, according to which the user does not fully charge his vehicle or the high-voltage energy storage device. This makes it possible to automatically provide a certain additional charge as an energy reserve for the stationary function. If, for example, it is clear from the energy profile that the user wishes to use the stationary function very often in the near future or in general, furthermore energy can also be charged in advance from the high-voltage on-board electrical system to the low-voltage on-board electrical system, for example even before the motor vehicle is in the parked state. In this way, under certain circumstances it may even be possible to completely avoid having to wake up or activate the high-voltage on-board electrical system in the parked state of the motor vehicle to recharge the low-voltage energy storage device. If, in the parked state of the motor vehicle, more energy is nonetheless required to carry out the stationary function than is currently stored in the low-voltage energy storage device, then the high-voltage on-board electrical system can also be temporarily activated in the parked state of the motor vehicle, i.e., the high-voltage energy storage device can be switched on again and via the DC-DC converter energy is fed from the high-voltage on-board electrical system into the low-voltage on-board electrical system for charging the low-voltage energy storage device, in particular if a certain remaining range, which can be specified by the energy profile, is still ensured and/or this recharging is in accordance with the other profile data stored in the energy profile, for example in terms of prioritization between using the stationary function and maximizing the range of the motor vehicle.

Depending on the typical frequency of use of the stationary function and the typical duration of use, which in turn can be derived from the historical usage data and can be stored in the energy profile, a certain amount of energy from the high-voltage energy storage device can also be reserved for carrying out the stationary function. This can also be done "invisibly" to the user. For example, this reserved amount of energy cannot be actively displayed to the user at all as contributing to the remaining range of the motor vehicle. For example, if the normal charge level of the high-voltage energy storage device moves in the range between 0 percent and 100 percent, and then, for example, 20 percent is reserved for the use of the stationary function, the remaining 80 percent can be displayed to the user as 100 percent. For example, if the actual charge level is reduced to 50 percent SOC (state of charge), the actual 50 percent will not be displayed to the user, but only a charge level of 30 percent, because the remaining 20 percent is reserved for the use of the stationary function "invisibly" to the user. This has the great advantage that if a user ultimately uses the stationary function and, for example, uses up the 20 percent charge level of the energy storage device for this purpose, he will not be confronted with a changed charge level of the high-voltage energy storage device, for example reduced by 20%, when after using the stationary function he wishes to drive the vehicle again. For example, if the user parks his vehicle with a charge level, i.e., a displayed charge level of 50 percent, then uses the stationary function and then continues driving again, a charge level of 50 percent is still displayed at the start of the continued journey, although a certain proportion of energy from the high-voltage energy storage device has already been consumed to use the stationary function. It is therefore particularly advantageous, depending on the energy profile, to determine and display a remaining charge level to be displayed to the user and/or a remaining range to be displayed to the user. However, this remaining charge level to be displayed or the remaining range to be displayed does not correspond to the actual remaining charge level or the actual remaining range, which may be more under certain circumstances due to the available energy still present, but which is reserved for the use of the stationary function. This reserved energy represents an invisible reserve, so to speak. This has another very significant advantage, because such an invisible reserve makes it possible to nonetheless consume it in an emergency situation, for example. For example, if the next charging stop is unintentionally located at a very large distance, so that it can no longer be reached with the displayed remaining range of the vehicle, the user can, for example, manually activate the release of the invisible reserve, which makes available to him an additional, for example 20 percent SOC. Although it will no longer be possible to use the stationary function in the near future, this will ensure that the next charging stop is reached safely. It is also advantageous to be able to draw on a certain reserve in case of other emergency situations, for example natural disasters such as floods, earthquakes, volcanic eruptions, and the like, during which it is necessary, for example, to leave the risk area in question as quickly as possible. In such situations, the amount of energy reserved for the stationary function can be released. In addition, a so-called external override is also conceivable, for example analogous to a Smart Grid. In case of a defined event occurring, for example an emergency situation as mentioned above, authorities or another authorized facility or higher-level institution can, for example, order maximum status functionality of the available instances via a wireless communication connection to the motor vehicle or to the control device, so that, for example, during a police chase, the lights of the vehicle are switched on as a stationary function and the surroundings are recorded using the camera systems as a further example of a stationary function. For example, the remaining amount of energy actually reserved for continued travel, which may not, at least not in normal cases, be used to carry out the stationary function, can be made available in such an emergency situation by overriding for the use of the stationary function.

The determination of a specific remaining amount of energy that cannot or may not be used to carry out the stationary function, depending on the energy profile, is particularly advantageous, as this enables the remaining amount of energy to be flexibly adjusted depending on the situation and user needs. It is therefore not always necessary to define the same remaining amount of energy, such as 20 percent SOC, but this remaining amount of energy can be varied flexibly depending on the energy profile, for example based on historical usage data of the motor vehicle, and can sometimes be more and sometimes less and, for example, can also vary from user to user according to the respective user-specific energy profiles.

If this remaining amount of energy or remaining range, which is to be reserved for continued travel, is reached, the stationary function is deactivated or cannot be carried out (again), at least not in the parked state of the vehicle, if it is not yet activated. This applies at least to stationary functions that are not safety-relevant. This particularly applies to stationary functions in the entertainment sector, i.e., entertainment stationary functions. If the vehicle is put back into operation or activated, i.e., the motor is switched on, these functions can also be used again. It is also conceivable, if the amount of energy still in the energy storage device, i.e. in the high-voltage energy storage device, approaches this remaining amount of energy, to successively switch off carrying out the stationary function or, when multiple stationary functions are being carried out, to deactivate them according to a certain sequence. For example, if the user is currently watching a film, for example, the volume can first be reduced slightly and the screen brightness can be successively reduced until ultimately the remaining amount of energy is actually reached, which then ends the display of such a film including the sound output.

The remaining amount of energy can, for example, be determined not only based on how far the driver or user would like to drive on average after using the stationary function, but also, for example, based on the prioritization between the stationary function and the range of the motor vehicle. For example, if the stationary function has a very high priority, the remaining amount of energy can be dimensioned less than in the case that the use of the stationary function is subordinate to maximizing the range of the motor vehicle.

Furthermore, the invention also relates to a control device for a motor vehicle, which is designed to carry out a method according to the invention or one of its embodiments.

Furthermore, the invention also relates to a motor vehicle having a control device according to the invention or one of its embodiments.

For applications or usage situations that can arise in the method and which are not explicitly described here, according to the method, it can be provided that an error message and/or a request for input of user feedback is output and/or a standard setting and/or a predetermined initial status are set.

The invention also includes the control device for the motor vehicle. The control device can have a data processing device or a processor device which is configured to carry out an embodiment of the method according to the invention. For this purpose, the processor device can have at least one microprocessor and/or at least one microcontroller and/or at least one FPGA (Field Programmable Gate Array) and/or at least one DSP (Digital Signal Processor). Furthermore, the processor device can have program code which is configured to carry out the embodiment of the method according to the invention when it is executed by the processor device. The program code can be stored in a data memory of the processor device. The processor device can be based, for example, on at least one circuit board and/or at least one SoC (System on Chip).

The invention also includes refinements of the control device and the motor vehicle according to the invention, which have features as already described in the context of the refinements of the method according to the invention. For this reason, the corresponding refinements of the motor vehicle and the motor vehicle according to the invention are not described again here.

The motor vehicle according to the invention is preferably designed as an automobile, in particular as a passenger car or truck, or as a passenger bus or motorcycle.

As a further solution, the invention also comprises a computer-readable storage medium, comprising program code which, when executed by a computer or a computer network, cause it to carry out an embodiment of the method according to the invention. The storage medium can be provided, for example, at least partially as a non-volatile data memory (such as a flash memory and/or as an SSD— solid state drive) and/or at least partially as a volatile data memory (such as a RAM—random access memory). The storage medium can be arranged in the computer or computer network. However, the storage medium can also be operated, for example, as a so-called app store server and/or cloud server on the Internet. A processor circuit having, for example, at least one microprocessor can be provided by the computer or computer network. The program code can be provided as binary code and/or as assembler code and/or as source code of a programming language (such as C) and/or as a program script (such as Python).

The invention also comprises the combinations of the features of the described embodiments. The invention therefore also comprises implementations that each have a combination of the features of several of the described embodiments, provided that the embodiments have not been described as mutually exclusive.

BRIEF DESCRIPTION OF THE DRAWINGS

Exemplary embodiments of the invention are described hereinafter. In the figures.

DETAILED DESCRIPTION

Figure 1:
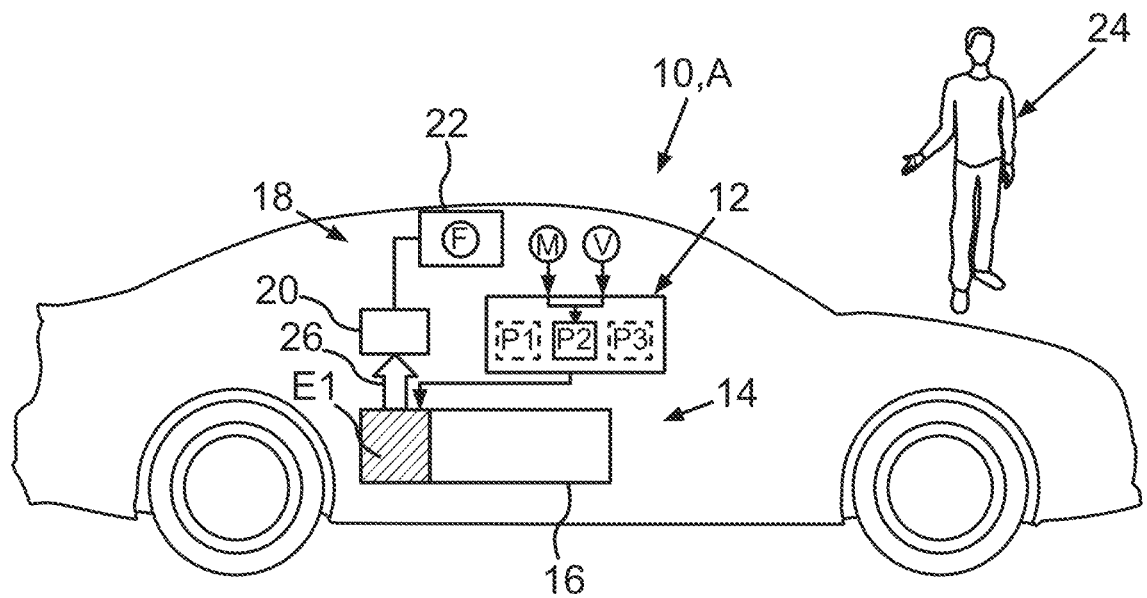
FIG. 1 shows a schematic representation of a motor vehicle having a control device according to a first exemplary embodiment of the invention.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

Figure 2:
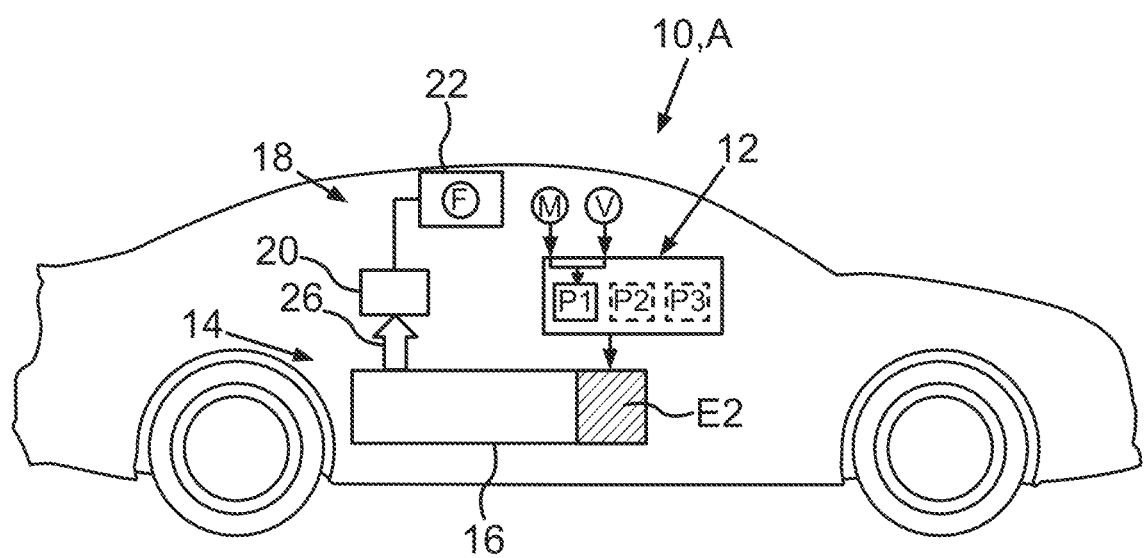
FIG. 2 shows a schematic representation of a motor vehicle having a control device according to a second exemplary embodiment of the invention.

FIG. 1 and FIG. 2 each show a schematic illustration of a motor vehicle 10 having a control device 12 according to an exemplary embodiment of the invention. The motor vehicle 10 has a high-voltage on-board electrical system 14 having a high-voltage energy storage device 16 in the form of a high-voltage battery 16. In addition, the motor vehicle 10 comprises a low-voltage on-board electrical system 18 having a low-voltage energy storage device 20. The low-voltage energy storage device 20 can be designed, for example, as a 12-volt battery. The motor vehicle 10 also comprises a component 22 for carrying out a stationary function F. This can be, for example, an entertainment component, for example a display screen or the like, using which video content, music, or the like can be output. This component 22 is also part of the low-voltage on-board electrical system 18 and is supplied accordingly for operation by the low-voltage energy storage device 20.

In the present example, the motor vehicle 10 is in a parked state A. The high-voltage on-board electrical system of a motor vehicle is usually switched off in such a state.

As a result, the low-voltage on-board electrical system only has extremely limited energy available in this parked state. In order to advantageously enable carrying out such stationary functions F in accordance with the needs of a user, it is on the one hand provided that, even in the parked state A, recharging of the low-voltage energy storage device 20 by the high-voltage vehicle electrical system 14 using the energy stored in the high-voltage energy storage device 16 is possible. The recharging of the low-voltage energy storage device 20 from the high-voltage energy storage device 16 is illustrated by the arrow 26. This enables significantly more flexible usage options, especially in the parked state A of the motor vehicle 10, in particular with regard to the use of such stationary functions F. However, in order not to run the risk that a user 24 of the motor vehicle 10 after using such a stationary function F is then confronted with an extremely low charge level of the high-voltage energy storage device 16 and is surprised thereby, it is now advantageously provided the operation of the motor vehicle is controlled by means of the control device 12 depending on an energy profile P1, P2, P3 . In the present example, three such energy profiles P1, P2, P3 are shown as examples. These can, for example, be stored in a memory of the control device 12. In principle, however, only a single such energy profile P1, P2, P3 can also be provided. There are various ways to create and/or use such an energy profile P1, P2, P3.

For example, such an energy profile P1, P2, P3 can be created and stored individually for each user 24 of the motor vehicle 10. It is also conceivable that multiple such energy profiles P1, P2, P3, which differ with regard to the control of the operation of the motor vehicle 10, in particular with regard to the energy management of the motor vehicle using the stationary function F, are predefined and can be selected by a user 24 or are automatically selected depending on other parameters. Each of these energy profiles P1, P2, P3 thus defines a specific mode of operation of the motor vehicle 10 with regard to energy management or certain rules for the operation of the motor vehicle 10. Such an energy profile P1, P2, P3 can, for example, be selected depending on a manual input M of the user 24. This allows the user 24 to define themselves, for example, how the use of the stationary function F is to be embedded in the energy management of the vehicle 10 or what importance is to be assigned to the use of the stationary function F. For example, the user 24 can use such a manual input M to specify whether or not the use of the stationary function F is to have priority over maximizing the range of the motor vehicle 10. For example, by selecting a corresponding profile P1, P2, P3 by means of such a manual input M, he can also define whether he wants to use the stationary function F frequently, rarely, or an average amount. Depending on such a manual input M, a specific one of the multiple provided profiles P1, P2, P3 can then be selected accordingly. Depending on such a manual input M, for example, a user-specific profile P1, P2, P3 can alternatively also first be created and stored assigned to the user 24.

Alternatively or additionally to such a manual input M, the control device 12 can also automatically create and/or select such a profile P1, P2, P3, depending, for example, on a learned user behavior of the user 24 in relation to the use of the motor vehicle 10 and/or the stationary function F. For this purpose, the control device 12 can use historical usage data V. These can be recorded virtually continuously during the use of the motor vehicle 10 in general by the user 24, as well as during the use of the stationary function F. These usage data V include, for example, how often the user 24 drives the motor vehicle 10, at what times of day, where the user 24 typically drives or how long the routes traveled typically are, when the user 24 typically charges the motor vehicle 10, according to which charging strategy he charges the motor vehicle 10, whether he displays a dynamic style with high energy consumption or a very economical driving style, whether he activates the stationary function F very often, uses it for a very long time, which of several possible stationary functions F he uses, when he uses them, how far he then drives, and so on. Over time, a large amount of information can thus be collected that allows the energy management of the motor vehicle 10 to be adapted as optimally as possible to the behavior and needs of the user 24, especially with regard to the use of the stationary function F. This has the advantage that the user 24 will in all probability only rarely be confronted with situations in which, for example, he would like to use the stationary function F, but this is not possible due to the available energy reserve being too low, or the user after using the stationary function F is confronted with a surprisingly small remaining range of the motor vehicle 10, which is no longer sufficient for the route that he still wanted to drive.

Two different possible uses of these energy profiles P1, P2, P3 will now be explained with reference to FIG. 1 and FIG. 2.

According to the example shown in FIG. 1, on the basis of the determined energy profile P1, P2, P3, in this example the second energy profile P2, which was selected and/or created, for example, based on the manual user input M and/or on the basis of the usage data V, an amount of energy E1 is now determined, which is to be provided as an energy reserve for using the stationary function F. This amount of energy E1 is then, so to speak, reserved for the high-voltage energy storage device 16 as an energy reserve for carrying out the stationary function F. The remaining energy that can be stored in the high-voltage energy storage device 16 can then be used as usual to carry out driving functions or other functions of the motor vehicle 10.

To determine a remaining range to be displayed or a remaining charge level to be displayed, a certain proportion can, for example, be subtracted from the actual remaining charge level or from the actual remaining range, which corresponds to this energy reserve E1 reserved for the stationary function F. Carrying out the stationary function F thus leaves the displayed remaining charge level or the displayed remaining range of the motor vehicle 10 untouched.

The first profile P1 can, for example, specify a very low prioritization of carrying out the stationary function F, the second profile P2 a medium prioritization, and the third profile P3 a very high prioritization. Accordingly, it can be provided, for example, that upon selection of the first profile P1, a smaller amount of energy would be reserved than the amount of energy E1 shown here for the second profile P2, and upon selection of the third profile P3, a correspondingly larger amount of energy than the amount of energy E1 shown would be reserved for carrying out the stationary function F.

According to the example shown in FIG. 2, depending on the selected profile P1, P2, P3, which in the present case represents the first profile P1, a remaining amount of energy E2 of the energy storage device 16 is determined, which in any case is still to be available to carry out a driving task of the motor vehicle 10 and therefore may not be used for operation or to carry out the stationary function F. The remaining energy stored or storable in the energy storage device 16 can, however, be used to carry out the stationary function F.

If, apart from this remaining amount of energy E1, there is no more energy in the high-voltage energy storage device 16 when the stationary function F is carried out, and if the energy stored in the low-voltage energy storage device 20 has also already been consumed, carrying out the stationary function F can be terminated or activation or reactivation thereof can be prevented. This ensures that the residual remaining amount of energy E2 still ensures a certain remaining range for the motor vehicle 10. This can in turn be determined depending on the selected energy profile P1, P2, P3. If the first energy profile P1 in turn specifies the lowest prioritization of the stationary function F, while the third energy profile P3 in turn specifies the highest prioritization of this stationary function F, then, for example, if the second profile P2were selected, this remaining amount of energy E2 would be even less than is presently shown, and in the case of selecting the third profile P3, it would be even less than upon selection of the second profile P2.

These exemplary embodiments can also be combined with one another in any way and can also be supplemented in any way by the above-described embodiments.

In principle, it is possible, by using one or more such energy profiles, to enable predictive energy management that is, above all, adapted to the needs of a user with regard to the provision of stationary functions.

Overall, the examples show how the invention can provide a use of the HV system of a BEV for use cases, i.e., applications, when stationary. The software-controlled energy provision of the high-voltage battery for the 12-volt system based on user needs for the activities and services of a parked BEV is advantageous here. The user can select an energy profile from maximum range to highest capacity for services while stationary, which results in a static profile occupancy. An AI (artificial intelligence)-generated energy profile is also conceivable, by which an automated solution can be provided. Both enable optimized use of the vehicle when stationary and an enhanced product experience and the creation of a basis for new diversifying use cases. It is advantageous to have a vehicle-integrated device that converts the voltage of the high-voltage system and provides the available energy in the 12-volt system. The device acts on the basis of the customer desire or the user desire, namely depending on the profile selection, or orchestrates a vehicle device, the load balancing system, by means of AI algorithms based on user behavior and habits. A system-based assurance that a minimum range is guaranteed can be implemented. The user is then optionally informed thereof, for example, if the high-voltage energy storage system can no longer be used for the services and the functions will be switched off according to a defined schedule. An external override is also conceivable for both variants, namely manual profile selection and automatic profile generation. In case of the occurrence of a defined event, for example an emergency situation, authorities or other authorized institutions can order a maximum stationary function of the available instances, so that, for example, in the event of a police chase, the lights of the vehicle are switched on and the surroundings are recorded using the camera systems.

The invention claimed is:

1. A method comprising:
    selectively controlling an operation of a motor vehicle, which comprises a low-voltage on-board electrical system and a high-voltage on-board electrical system having a high-voltage energy storage device;
    providing at least one stationary function in a parked state of the motor vehicle, by supplying a component of the motor vehicle that carries out the at least one stationary function with energy from the low-voltage onboard electrical system;
    providing at least one energy profile, which relates to the use of the at least one stationary function by a user of the motor vehicle; and
    controlling the operation of the motor vehicle depending on the at least one energy profile, wherein recharging of the low-voltage on-board electrical system by the high-voltage energy storage device is altered based upon usage of the at least one stationary function.

2. The method according to claim 1, further comprising:
    providing multiple different energy profiles for the use of the at least one stationary function; and
    selecting, via user input, the specific energy profile from the multiple different energy profiles.

3. The method according to claim 2, further comprising:
    creating the specific energy profile for a specific user by means of an artificial neural network;
    storing the created energy profile; and,
    assigning the stored energy profile to the specific user.

4. The method according to claim 2, wherein at least one piece of information is specified by a user input and profile information is stored in the specific energy profile depending on the at least one piece of information.

5. The method according to claim 2, wherein the specific energy profile and/or at least one piece of information, depending on which profile information is stored in the specific energy profile, comprises a priority specification related to weighting between carrying out stationary functions and maximizing a range of the motor vehicle.

6. The method according to claim 2, wherein the specific energy profile and/or profile information that is stored in the energy profile and that is derived from recorded information comprises user-specific, historical usage data of the at least one stationary function by the user.

7. The method according to claim 1, further comprising:
    creating the specific energy profile for a specific user by means of an artificial neural network;
    storing the created energy profile; and
    assigning the stored energy profile to the specific user.

8. The method according to claim 7, wherein at least one piece of information is specified by a user input and profile information is stored in the specific energy profile depending on the at least one piece of information.

9. The method according to claim 7, wherein the specific energy profile and/or at least one piece of information, depending on which profile information is stored in the specific energy profile, comprises a priority specification related to weighting between carrying out stationary functions and maximizing a range of the motor vehicle.

10. The method according to claim 7, wherein the specific energy profile and/or profile information that is stored in the energy profile and that is derived from recorded information comprises user-specific, historical usage data of the at least one stationary function by the user.

11. The method according to claim 1, wherein at least one piece of information is specified by a user input and profile information is stored in the specific energy profile depending on the at least one piece of information.

12. The method according to claim 11, wherein the specific energy profile and/or at least one piece of information, depending on which profile information is stored in the specific energy profile, comprises a priority specification related to weighting between carrying out stationary functions and maximizing a range of the motor vehicle.

13. The method according to claim 11, wherein the specific energy profile and/or profile information that is stored in the energy profile and that is derived from recorded information comprises user-specific, historical usage data of the at least one stationary function by the user.

14. The method according to claim 1, wherein the specific energy profile and/or at least one piece of information, depending on which profile information is stored in the specific energy profile, comprises a priority specification related to weighting between carrying out stationary functions and maximizing a range of the motor vehicle.

15. The method according to claim 14, wherein the specific energy profile and/or profile information that is stored in the energy profile and that is derived from recorded information comprises user-specific, historical usage data of the at least one stationary function by the user.

16. The method according to claim 1, wherein the specific energy profile and/or profile information that is stored in the energy profile and that is derived from recorded information comprises user-specific, historical usage data of the at least one stationary function by the user.

17. The method according to claim 16, wherein the usage data relate to at least one of:
- the use of the at least one stationary function;
- a driving behavior, comprising route data of routes traveled;
- a time-dependent use of the motor vehicle or certain functions of the motor vehicle; and
- carrying out charging processes.

18. The method according to claim 1, wherein depending on the energy profile, at least one of the following operating functions is carried out:
- energy is charged from the high-voltage vehicle electrical system into the low-voltage vehicle electrical system, in particular into a low-voltage energy storage device;
- a specific first amount of energy stored in the high-voltage energy storage device is reserved for carrying out the at least one stationary function;
- a certain amount of remaining energy of the high-voltage energy storage device is determined, which cannot be used for executing the stationary function, or a minimum charge level of the high-voltage energy storage device is determined, and, when the charge level reaches or falls below this level, the at least one stationary function can no longer be carried out and/or is deactivated; and
- a remaining charge level to be displayed to the user and/or a remaining range to be displayed to the user is determined and displayed.

19. A control device configured to carry out the method according to claim 1.

20. The control device according to claim 19, wherein the control device is configured to store an artificial intelligence (AI) generated energy profile.

* * * * *